Aug. 21, 1956 A. V. YANCEY 2,759,758
FISH GAFF
Filed June 6, 1955
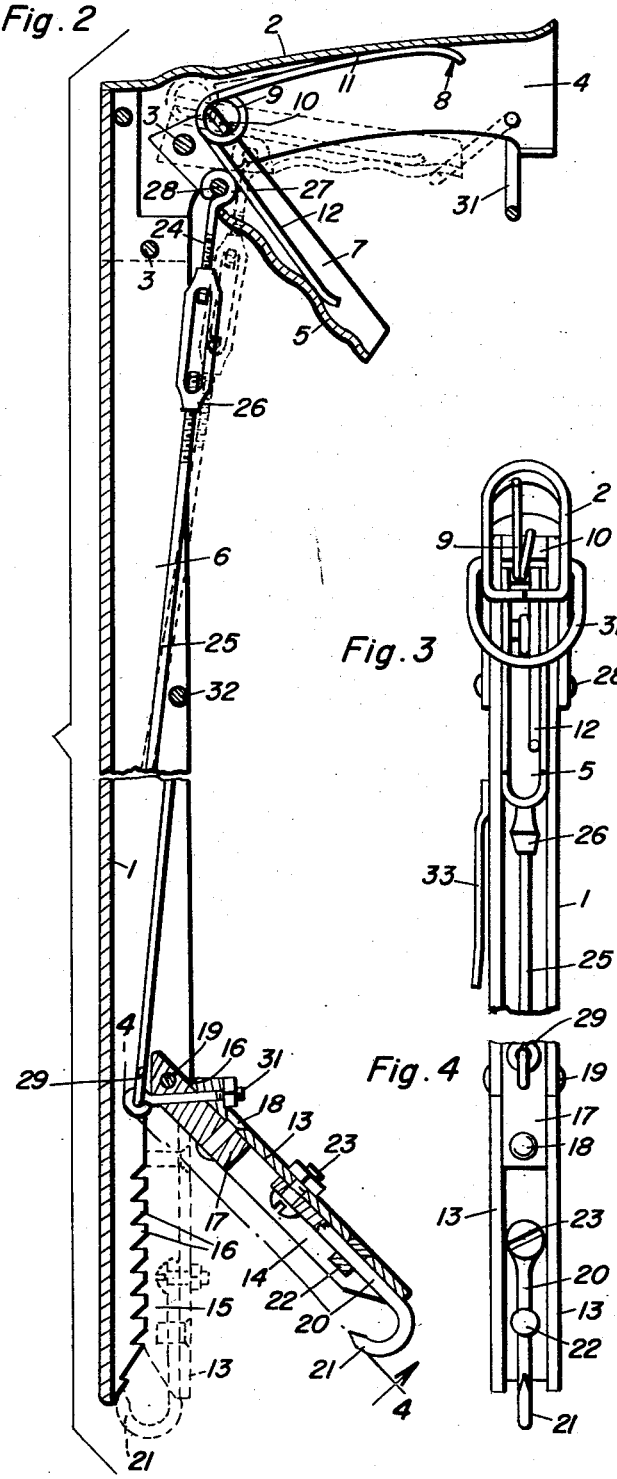
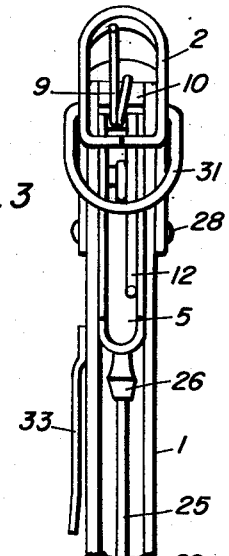
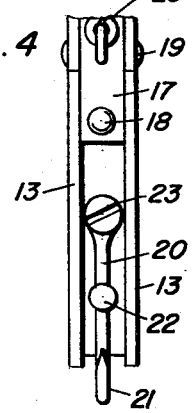
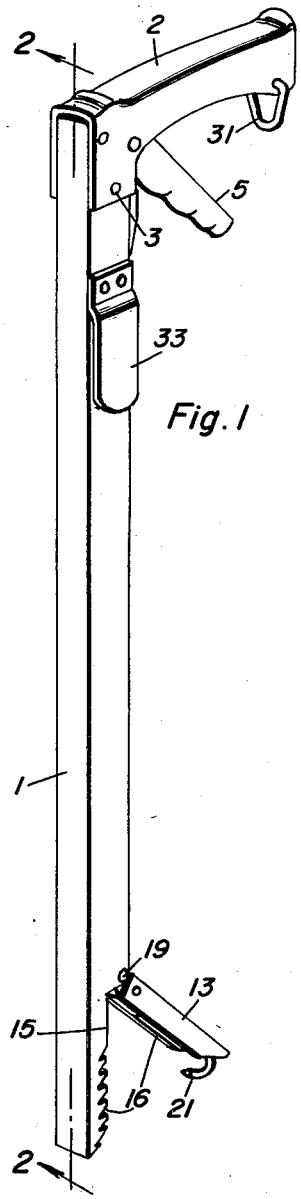
Adolphus V. Yancey
INVENTOR.

United States Patent Office 2,759,758
Patented Aug. 21, 1956

2,759,758
FISH GAFF
Adolphus V. Yancey, Cocoa, Fla.
Application June 6, 1955, Serial No. 513,217
3 Claims. (Cl. 294—104)

The present invention relates to new and useful improvements in gaffs for use in landing fish as well as for releasing fishing hooks snagged with submerged weeds.

An important object of the invention is to provide a tool constructed with an elongated shank having a gaff hook pivoted to its lower end and actuated by a lever at the upper end of the shank to swing the hook inwardly toward the shank into gaffing engagement with a fish.

A further object is to construct the shank of channel shape to receive and provide a shield for protecting the hook when not in use and also to provide latch means for locking the lever and hook in inactive position.

A still further object is to provide a gaff of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view;

Figure 2 is an enlarged vertical sectional view taken on a line 2—2 of Figure 1, and partly broken away;

Figure 3 is a rear elevational view of the upper portion of the gaff; and

Figure 4 is a fragmentary vertical sectional view taken on the line 4—4 of Figure 2.

Referring to the drawing by numerals, the fish gaff of my invention comprises a shank 1 of channel construction to the upper end of which a channel shaped pistol grip handle 2 is secured by bolts 3 to extend laterally from the channel side 6 of the shank 1. The channel 4 of the handle 2 faces downwardly.

A channel shaped hand lever 5 is pivoted at one end on one of the bolts 3 in the channel 4 of the handle 2 and the channel 6 of the shank with its channel 7 facing the channel 4 of said handle 2.

A hairpin spring 8 interposed between the handle 2 and the hand lever 5 urges said lever 5 outwardly of said handle 2 into a normal position established as presently described. The spring 8 is attached to the pivoted end of the hand lever 5 by a coil 9 on the spring surrounding a cross bar 10 on the hand lever 5 and the legs 11, 12 of said spring 8 slide in the channels 4, 7 of the handle 2 and hand lever 5.

A gaff hook carrying arm 13 of channel form is provided at the lower end of the shank 1 to depend therefrom coplanar therewith and with its channel 14 facing the shank 1. The arm 13 is pivotally mounted at its upper end on the shank 1 to swing outwardly therefrom into an inclined position or to swing inwardly into a recess 15 in the lower end of the shank 1 with its sides coplanar and opposite rows of teeth 16 formed in the sides of the shank 1 at the sides of the recess 15.

The arm 13 is pivotally mounted by means of a plug 17 in its channel 14 fixed to said arm by a rivet 18 and extending out of the upper end of said channel 14 into the channel 6 of the shank 1 with a pivot pin 19 extending through the same and the sides of said shank. The upper end of the arm 13 engages the sides of the shank 1 and limits outward swinging of said arm.

A gaff hook 20 is fixed in the channel 14 of the arm 13 with its barb end 21 extending out of the lower end of said arm 13 and facing the shank 1. An apertured stud 22 riveted in the arm 13 fixes the hook 20 intermediate its ends to the arm 13 and a bolt 23 fixes the eye end of said hook to said arm.

The hand lever 5 is operatively connected to the arm 13 by upper and lower rod sections 24, 25 adjustably connected together by a turnbuckle 26. The upper rod section 24 is pivoted to said lever 5 by a terminal eye 27 on the rod section and a transverse pin 28 in said lever extending through said eye 27. The lower rod section 25 is pivotally connected to the arm 13 between said arm and the shank 1 and below the pivot 19 by an eye 29 on the lower end of said section 25 swivelling in an eye bolt 31 passing through the upper end of said arm 13 and through the plug 17 below the pivot 19.

As will be manifest the spring 8 urges the hand lever 5 into a normal downwardly inclined position to move the rod sections 24, 25 downwardly and thereby swing the arm 13 and gaff hook 20 outwardly of the shank 1 into its limit of outward movement which thereby establishes the normal position of said lever 5, all as shown in full lines in Figure 2.

To gaff a fish the hand lever 5 is squeezed by the hand into the channel 4 of the handle 2 whereupon the rod sections 24, 25 will swing the arm 13 and hook 20 toward the shank 1 to hook a fish and squeeze the catch between said arm and the teeth 15. Upon release of the hand lever 5 the spring 8 will return the parts to normal position. When the gaff is not in use the hand lever 5 is squeezed into the channel 4 of handle 2 until the arm 13 is swung into the recess 15 to swing the barb end 21 of the hook 20 into the channel 6 of the shank 1 and bridge the teeth 16 with the sides of said arm all as shown in dotted lines in Figure 2 and for protection purposes. A link 31 on the handle 2 may then be swung over the hand lever to lock the parts in position. A transverse pin 32 is provided in the shank 1 for sliding engagement by the rod section 25 to steady said section.

A resilient clip 33 is provided on one side of the shank 1 for hanging the gaff on a support when not in use.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish gaff comprising a shank having a lateral handle on its upper end, a spring tensioned hand lever pivoted to said handle for operation toward the same, a hook at the lower end of said shank, means pivotally mounting said hook on said shank for swinging movement toward the shank in gaffing a fish, and means operatively connecting said hand lever to said first named means, said first means comprising an arm to which said hook is fixed and having a lower end from which said hook projects, the other end of said arm being pivoted to said shank, said last means comprising rod sections pivotally connected to said lever and arm respectively, and a turnbuckle connecting said rod sections together for relative adjustment.

2. A fish gaff according to claim 1 said shank having a recess in its lower end for receiving said arm.

3. A fish gaff according to claim 1 said lower end of the shank being toothed for holding a fish between the lower end of the shank and said arm.

References Cited in the file of this patent

UNITED STATES PATENTS

| | | |
|---|---|---|
| 1,004,297 | Nygren | Sept. 26, 1911 |
| 2,584,371 | Shackel | Feb. 5, 1952 |